Patented Apr. 17, 1951

2,549,685

UNITED STATES PATENT OFFICE 2,549,685

DIOXY SUBSTITUTED 2-AMINOINDANOLS

Richard V. Heinzelmann, Kalamazoo, Mich., assignor to The Upjohn Company, Kalamazoo, Mich., a corporation of Michigan No Drawing. Application September 30, 1948,
Serial No. 52,120

6 Claims. (Cl. 260—570.5)

This invention relates to aminoindanols, particularly to certain 2-aminoindanols-1 having ortho substituents on the aromatic ring of the indane nucleus, and to addition salts thereof with acids.

The new compounds with which the present invention is concerned are the di-substituted aminoindanols which can be represented by the generic formula

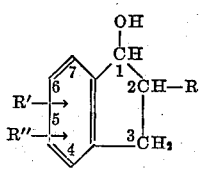

wherein R' is a methoxy radical, R" is in a position ortho to R' and is from the group consisting of the hydroxy and methoxy radicals and R is from the group consisting of the amino, monoalkylamino, lower di-n-alkylamino and monoaralkylamino radicals, and the acid addition salts thereof. The free bases are referred to herein as "di-substituted aminoindanols". By a "lower di-n-alkylamino radical" is meant a dialkylamino radical wherein the alkyl groups each contain a straight carbon chain having less than four carbon atoms, such as the dimethylamino, diethylamino and di-n-propylamino radicals. Addition salts included within the scope of the invention include those formed with hydrochloric, hydrobromic, sulfuric, phosphoric, succinic, citric and other acids.

Members of the new class of compounds described herein have been prepared and physical properties thereof determined whereby they can be identified. The salts are well defined crystalline compounds which are generally soluble in water and alcohol and substantially insoluble in ether, benzene, carbon tetrachloride and ethyl acetate. They generally melt with decomposition and can be crystallized from alcohol or a mixture of alcohol and ether. The free amines are generally stable crystalline substances soluble in the common organic solvents. The new compounds are of value for their effects in the relaxation of constricted bonchi and in altering the blood pressure. The di-substituted aminoindanols and their salts having no substituents on the amino nitrogen atom are of further value as intermediates from which the N-substituted di-substituted aminoindanols and their salts can be prepared.

The invention will be further described with particular reference to the salts of the di-substituted aminoindanols it being understood, however, that the free di-substituted aminoindanols are also contemplated. The free di-substituted aminoindanols can be prepared readily by decomposing their salts with alkali in conventional manner and in other ways as will be apparent as the description proceeds.

The new salts herein described wherein R of the generic formula given represents the unsubstiuted amino radical, i. e. salts of the di-substituted 2-aminoindanols-1, can be prepared readily by hydrogenation of the corresponding di-substituted 2-aminoindanones-1, preferably by hydrogenation under the influence of a hydrogenation catalyst. Compounds of the invention wherein R represents a substituted amino radical within the limits of the definition previously given can be prepared readily by reacting an appropriate di-substituted 2-aminoindanol-1 with an aldehyde or ketone and hydrogenating the reaction product.

The reduction of a salt of a di-substituted 2-aminoindanone-1 to a salt of a di-substituted 2-aminoindanol-1 is carried out conveniently by subjecting an aqueous solution of the salt to the action of hydrogen, preferably under superatmospheric pressure and at from about 40° to about 70° C., in the presence of a hydrogenation catalyst, such as active palladium on charcoal or a platinum or platinum oxide catalyst. The hydrogenation reaction is usually substantially complete in from about two to about twelve hours, depending upon the reaction conditions. The acid addition salt of the di-substituted 2-aminoindanol-1 can be isolated readily from the reaction mixture by filtering to remove the catalyst, evaporating the filtrate substantially to dryness and crystallizing the residue from a suitable solvent, such as a mixture of alcohol and ether. The salts are thus obtained as pure crystalline products.

The di-substituted-2-aminoindanone-1 salts used as starting materials in the process of the present invention can be prepared readily according to the method of concurrently filed, copending application Serial No. 51,869, by subjecting a di-substituted 2-isonitrosoindanone-1, wherein the two substituents are on the benzene ring of the indane nucleus in positions ortho to one another, to the action of hydrogen under the influence of a catalyst, such as active palladium on charcoal or a platinum oxide or reduced platinum oxide similar to that generally referred to as the Adams catalyst, until 2 mols of hydrogen for each mol of isonitroso compound have been absorbed. The hydrogenation is carried out in an acid medium, such as anhydrous alcoholic hydrogen chloride, containing sufficient acid to form the acid addition salt of the aminoindanone as fast as it is formed. The hydrogenation of the isonitrosoindanone can be carried out at ordinary room temperatures although the speed of the reaction is increased by warming the mixture at from about 40° to about 70° C. The acid addition salt of the di-substituted 2-aminoindanone-1 can be recovered in high yield by filtering the reaction mixture to remove the catalyst and precipitating the salt from the filtrate by the addition of ether, ethyl acetate or other suitable liquid.

The di-substituted isonitrosoindanones from which the salts of the di-substituted 2-aminoindanones-1 can be obtained are prepared readily from the appropriately di-substituted indanones-1 according to the method of Levin and Hartung, J. Org. Chem. 7, 408 (1942), by the simultaneous addition under anhydrous conditions of an alkyl nitrite and hydrogen chloride to an ethereal solution of the di-substituted indanone-1.

The reaction of an aldehyde or ketone with a di-substituted 2-aminoindanol-1 and the hydrogenation of the resulting reaction product to form a salt of di-substituted 2-aminoindanol-1 having a substituent or substituents on the amino nitrogen atom can be carried out in a single operation, if desired. Thus an acid addition salt of a di-substituted 2-aminoindanol-1 and an acid binding agent, such as sodium carbonate, potassium bicarbonate and the like, can be suspended or dissolved in alcohol and an aldehyde or ketone and the catalyst then added and the entire mixture subjected to hydrogenation, preferably at a slightly elevated pressure and temperature. Satisfactory results have been obtained under a hydrogen pressure of about 2 to 3 atmospheres and at a temperature of from about 40° to about 50° C. Under such conditions, the theoretical quantity of hydrogen is generally absorbed in about one hour or less. The product is preferably recovered by filtering to remove the catalyst and pouring the filtrate into a relatively large volume of ether containing an acid, such as hydrogen chloride or hydrogen bromide. Upon filtering the ethereal mixture, the acid addition salt of the di-substituted 2-aminoindanol-1 having a substituent on the amino nitrogen atom is recovered in crystalline form and can be purified, if desired, by crystallization from a mixture of alcohol and ether.

It has been observed that when an aliphatic aldehyde containing less than about 4 carbon atoms is used in the process, a mixture of monoalkylamino and dialkylamino compounds is formed, the proportion of monoalkylamino compound being greater the greater the number of carbon atoms in the aliphatic aldehyde. When formaldehyde is used in the process, the major portion of the product is a dimethylamino compound with only a small proportion of monomethylamino compound being formed. When propionaldehyde is used in the process, only a small proportion of the di-n-propylamino compound is formed the principal product being a mono-n-propylamino compound. When butyraldehyde or a higher aliphatic aldehyde is used in the process, little if any of the dialkylamino compound is formed. When using aliphatic ketones only the branched chain monoalkylamino compounds are formed.

It has been further observed that when benzaldehyde is used in the process, an intermediate reaction product of the di-substituted 2-aminoindanol-1 and benzaldehyde can be isolated. This intermediate compound appears to be a di-substituted 2-phenyl-1′, 2′-oxazolidine having the formula

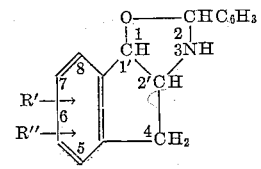

The reaction of a di-substituted 2-aminoindanol-1 with benzaldehyde can be carried out readily by warming a mixture of an acid addition salt of the di-substituted 2-aminoindanol-1 and benzaldehyde together with sufficient of an acid binding agent, such as sodium carbonate, potassium bicarbonate and the like, to combine with the acid of the acid addition salt. The reaction can be carried out without the use of a reaction medium, but is preferably carried out in a suitable liquid medium, such as alcohol or a mixture of alcohol and ethyl acetate. The mixture is usually heated, e. g. under reflux, for several hours and then cooled and filtered to remove inorganic salts. The di-substituted 2-phenyl-indano-1′, 2′-oxazolidine can be isolated readily from the reaction mixture by pouring the mixture into water to precipitate the oxazolidine and filtering, or by evaporating the reaction mixture to dryness and subsequently washing the residue with water to remove inorganic salts. The new oxazolidines are well-defined crystalline compounds having sharp melting points and forming hydrochlorides and other addition salts with acids which usually melt with decomposition.

Reduction of a di-substituted 2-phenyl-indano-1′, 2′-oxazolidine to a di-substituted 2-benzylamino-indanol-1 can be effected with hydrogen under the influence of a hydrogenation catalyst such as the palladium and platinum catalysts previously referred to. The reaction is carried out by dissolving the oxazolidine or its acid addition salt in a suitable solvent, such as anhydrous ethanol, and, after adding the catalyst, subjecting the mixture to the action of hydrogen until one mol of hydrogen is absorbed for each mol of oxazolidine compound in the reaction mixture. The reaction proceeds readily under atmospheric pressure at ordinary room temperature and is generally substantially complete in about one hour or less. Following the hydrogenation step, the solution can be filtered to remove the catalyst and the acid addition salt of the di-substituted 2-benzylamino-indanol-1 recovered by diluting the filtrate with ether, ethyl acetate or other suitable liquid to precipitate the addition salt.

Compounds contemplated by the invention which can be prepared by the methods given include, among others, 2-amino-4,5-dimethoxyindanol-1 hydrochloride, 2-amino-5,6-dimethoxy-indanol-1 hydrobromide, 2-amino-6,7-dimethoxyindanol-1 sulfate, 2-amino-4-hydroxy-5-methoxyindanol-1 phosphate, 2-amino-5-hydroxy-4-methoxyindanol-1 succinate, 2-amino-5-hydroxy-6-methoxyindanol-1 benzoate, 2-amino-6 - hydroxy - 5 - methoxyindanol - 1 tartrate, 2-amino-6-hydroxy-7-methoxyindanol-1 citrate, 2 - amino - 7 - hydroxy - 6 - methoxyindanol-1 propionate, 2-dimethylamino-5-hydroxy-4-methoxyindanol-1 hydrochloride, 2-diethylamino-5-hydroxy-6-methoxyindanol-1 hydrochloride, 2- di - n - propylamino - 6 - hydroxy - 7 - methoxyindanol-1 hydrochloride, 2-dimethylamino-5,6-dimethoxyindanol-1 hydrochloride, 2-methylamino-6,7-dimethoxyindanol-1 hydrochloride, 2-n-butylamino-4,5-dimethoxyindanol-1 hydrochloride, 2 - iso - butylamino - 4,5 - dimethoxyindanol-1 hydrochloride, 2-iso-propylamino-5,6-dimethoxyindanol-1 hydrochloride, 2-ethylamino-4-hydroxy-5-methoxyindanol-1 hydrochloride, 2-decylamino-5-hydroxy-6-methoxyindanol-1 hydrochloride, 2-octylamino-4,5-dimethoxyindanol-1 hydrochloride, 2-benzylamino-4,5-dimethoxyindanol-1 hydrochloride, 2-benzylamino-5,6-dimethoxyindanol-1 hydrochloride, 2-benzylamino - 6,7 - dimethoxyindanol - 1 hydrochloride, 2-benzylamino-4-hydroxy-5-methoxyindanol-1 hydrochloride, 2-(beta-phenylethyl)-amino - 5,6 - dimethoxyindanol - 1 hydrochloride and the corresponding free amines.

Certain advantages of the invention are apparent from the following examples which are given by way of illustration only and are not to be construed as limiting.

Example 1

Two grams of active palladium charcoal catalyst were added to a solution of 22.1 grams of 2-isonitroso-5, 6-dimethoxyindanone-1 (Perkin and Robinson, J. Chem. Soc. 1073 (1907)) in 125 milliliters of absolute ethanol containing 11 grams of dry hydrogen chloride. The mixture was shaken at about 40° C. under hydrogen at about three atmospheres pressure until two molecular proportions of hydrogen had been absorbed. This required about twelve hours. The mixture can be heated to about 60° C., or fresh catalyst can be added to shorten the hydrogenation time, if desired. The suspension was then heated and additional absolute ethanol was added until the 2-amino-5,6-dimethoxyindanone-1 hydrochloride which had precipitated was entirely dissolved. The catalyst was removed by filtration. The addition of ether to the filtrate, followed by cooling, gave 2-amino-5,6-dimethoxyindanone-1 hydrochloride which was further purified by dissolving in alcohol, treating with decolorizing charcoal, filtering, adding ether and cooling. The hydrochloride was thus obtained in the form of pure white crystals.

Anal.—Calc'd. for $C_{11}H_{14}O_3NCl$: C, 54.20; H, 5.79; N, 5.74; Cl, 14.56. Found: C, 54.11; H, 5.82; N, 5.82; Cl, 14.54.

In like manner there was obtained from 2-isonitroso-4,5-dimethoxyindanone-1 (Perkin and Robinson, Am. Chem. Soc. 2389 (1914)) 2-amino-4,5-dimethoxyindanone-1 hydrochloride melting with decomposition at 185° C.

Anal.—Calc'd. for $C_{11}H_{14}O_3NCl$: C, 54.30; H, 5.80; N, 5.76. Found: C, 54.16; H, 6.02; N, 5.48.

In like manner there was obtained from 2-isonitroso - 5 - methoxy - 6 - hydroxy - indanone-1 (M. P. 240° C. (dec.) obtained from 5-methoxy - 6 - hydroxy - indanone - 1) 2 - amino-5-methoxy-6-hydroxy-indanone-1 hydrochloride monohydrate melting with decomposition when immersed in a bath at 300° C.

Anal.—Calc'd. for $C_{10}H_{14}O_4NCl$: C, 48.49; H, 5.70; N, 5.66. Found: C, 48.49; H, 5.73; N, 5.73.

Example 2

Twelve and two-tenths grams of 2-amino-5,6-dimethoxy-indanone-1 hydrochloride were dissolved in 100 milliliters of distilled water and 2.0 grams of active palladium charcoal catalyst were added. The suspension was hydrogenated under a hydrogen pressure of three atmospheres and at a temperature between 40° and 60° C. until one molecular proportion of hydrogen had been absorbed. The catalyst was removed by filtration and the colorless aqueous filtrate was concentrated in vacuo until crystallization started. The concentrated aqueous solution was then poured into ethyl alcohol, ether was added and the solution was cooled. The white product which separated was filtered and recrystallized from a mixture of alcohol and ether. The 2-amino - 5,6 - dimethoxyindanol - 1 hydrochloride thus obtained darkens at about 200° C.

Anal.—Calc'd. for $C_{11}H_{16}O_3NCl$: C, 53.77; H, 6.56; N, 5.70. Found: C, 53.94; H, 6.59; N, 5.69.

In a like manner 2-amino-4,5-dimethoxyindanol-1 hydrochloride melting with decomposition at 183° C. was obtained from 2-amino-4,5-dimethoxyindanone-1 hydrochloride.

Anal.—Calc'd. for $C_{11}H_{16}O_3NCl$: C, 53.77; H, 6.56; N, 5.70. Found: C, 53.94; H, 6.64; N, 6.02

Likewise 2 - amino - 5 - methoxy - 6 - hydroxyindanol-1 hydrochloride melting at 258° C. (dec.) was obtained from 2-amino-5-methoxy-6-hydroxyindanone-1 hydrochloride.

Anal.—Calc'd. for $C_{10}H_{14}O_3NCl$: C, 51.83; H, 6.09; N, 6.05. Found: C, 51.72; H, 6.20; N, 6.19.

2-amino-5,6-dimethoxyindanol-1, 2-amino-4,5-dimethoxyindanol-1 and 2-amino-5-methoxy-6-hydroxyindanol-1 are prepared by neutralizing an aqueous solution of the corresponding hydrochloride with sodium bicarbonate, extracting the neutralized solution with ether, drying the ether extract and evaporating the ether.

Example 3

Twelve and three-tenths grams of 2-amino-5,6-dimethoxy indanol-1 hydrochloride were dissolved in 200 milliliters of absolute alcohol and 6.0 milliliters of benzaldehyde and 8.4 grams of sodium bicarbonate were added. The suspension was heated under reflux in an atmosphere of nitrogen for 16 hours. The mixture was then cooled to room temperature and filtered to remove the sodium chloride which had separated. The filtrate was poured into ice water, cooled and filtered. The precipitate consisted of 11.1 grams of crude 2-phenyl-6,7-dimethoxyindano - 1',2' - oxazolidine melting at 120° C. This product contained both possible racemic mixtures. The crude product was triturated with petroleum ether to remove unreacted benzaldehyde, filtered and the solid dissolved in acetone. The solution was treated with decolorizing charcoal, filtered and diluted with ether. Upon cooling the solution, crystals of 2 - phenyl-6,7-dimethoxyindano-1',2'-oxazolidine were obtained which after recrystallizing from a small amount of acetone melted at 165.5°–166.5° C.

Anal.—Calc'd. for $C_{18}H_{19}O_3N$: C, 72.71; H, 6.64; N, 4.71. Found: C, 72.95; H, 6.65; N, 4.49.

The hydrochloride prepared from the above racemic mixture melted with decomposition at 192° C.

Anal.—Calc'd. for $C_{18}H_{20}NCl$: C, 64.75; H, 600; N, 4.19. Found: C, 65.04; H, 5.99; N, 4.35.

Concentration of the main filtrate from which the racemic mixture melting at 165.5°–166.5° C. was obtained followed by filtration and crystallization of the precipitate from a mixture of acetone and ether gave a second more soluble racemic mixture melting at 123°–124° C.

Anal.—Calc'd. for $C_{18}H_{19}O_3N$: C, 72.71; H, 6.44; N, 4.71. Found: C, 72.54; H, 6.44; N, 4.70.

In like manner 2 - phenyl-5,6-dimethoxy-indano-1',2'-oxazolidine melting at 90.5°–93° C. was obtained from 2-amino-4,5-dimethoxyindanol-1 and benzaldehyde.

*Anal.*—Calc'd. for $C_{18}H_{19}O_3N$: C, 72.71; H, 6.44; N, 4.71. Found: C, 72.79; H, 6.19; N, 4.89.

The hydrochloride of this oxazolidine was obtained melting at 148°–150° C. with decomposition.

*Anal.*—Calc'd. for $C_{18}H_{20}O_3NCl$: C, 64.75; H, 6.00; N, 4.19. Found: C, 65.10; H, 6.43; N, 4.33.

Example 4

The dimethoxy oxazolidines or their hydrochloride as obtained in Example 3 were dissolved in absolute ethanol and hydrogenated using an active palladium charcoal catalyst at atmospheric pressure and room temperature. The calculated quantity of hydrogen was usually absorbed within about one hour. After filtration to remove the catalyst, the alcoholic solution was concentrated and cooled, whereupon the dimethoxy-2-benzylaminoindanol-1 or its salt separated in crystalline form. The free amino compounds were further identified by the preparation of their hydrochlorides. The following compounds were thus prepared:

2 - benzylamino-4,5-dimethoxyindanol-1-hydrochloride melting at 168.5°–169° C. (from 2-phenyl-5,6-dimethoxyinando - 1',2'-oxazolidine melting at 90.5°–93° C.).

*Anal.*—Calc'd. for $C_{18}H_{22}O_3NCl$: C, 64.37; H, 6.60; N, 4.17. Found: C, 64.26; H, 6.72; N, 4.44.

2-benzylamino-5,6-dimethoxyindanol-1 melting at 143°–144° C. (from 2-phenyl-6,7-dimethoxyindano - 1',2' - oxazolidine melting at 165.5°–166.5° C.).

*Anal.*—Calc'd. for $C_{18}H_{21}O_3N$: C, 72.20; H, 7.07; N, 4.68. Found: C, 72.23; H, 7.02; N, 4.52.

The hydrochloride melted with decomposition at 200° C.

*Anal.*—Calc'd. for $C_{18}H_{22}O_3NCl$: C, 64.37; H, 6.60; N, 4.17. Found: C, 64.39; H, 6.71; N, 4.37.

2-benzylamino-5,6-dimethoxyindanol-1 melting at 156°–156.5° C. (from 2-phenyl-6,7-dimethoxyindano - 1',2' - oxazolidine melting at 123°–124° C.).

*Anal.*—Calc'd. for $C_{18}H_{21}O_3N$: C, 72.20; H, 7.07. Found: C, 72.24; H, 7.11.

The hydrochloride melted with decomposition at 184° C.

*Anal.*—Calc'd. for $C_{18}H_{22}O_3NCl$: C, 64.37; H, 6.60; N, 4.17. Found: C, 63.90; H, 6.69; N, 4.44.

Example 5

A mixture of 4.91 grams of 2-amino-5,6-dimethoxyindanol-1 hydrochloride, 2.12 grams of freshly distilled benzaldehyde and 2.12 grams of sodium carbonate was added to a suspension of freshly reduced Adams platinum catalyst in absolute ethanol and the mixture subjected to hydrogenation at ordinary room temperature under a pressure of three atmospheres of hydrogen. The calculated quantity of hydrogen was absorbed in 30 minutes after which the suspension was warmed, filtered to remove the catalyst and the filtrate poured into cold ethereal hydrogen chloride. After further cooling, a white precipitate was obtained which was recovered by filtering and recrystallized from absolute alcohol. The pure white crystalline product melted at 181.5° C. (dec.) and was identical with the lower melting 2-benzylamino-5,6-dimethoxyindanol-1 hydrochloride obtained in Example 4.

*Anal.*—Calc'd. for $C_{18}H_{22}O_3NCl$: C, 64.37; H, 6.60; N, 4.17. Found: C, 64.36; H, 6.58; N, 4.41.

By a procedure similar to that described above but using acetone instead of benzaldehyde there was obtained 2-isopropylamino-5,6-dimethoxyindanol-1 hydrochloride which after recrystallization from absolute alcohol melted at 190° C. (dec.).

*Anal.*—Calc'd. for $C_{14}H_{22}O_3NCl$: C, 58.43; H, 7.71; N, 4.87. Found: C, 58.54; H, 7.66; N, 5.05.

By a procedure similar to that described above but using formaldehyde instead of benzaldehyde there was obtained 2-dimethylamino-5,6-dimethoxyindanol-1 hydrochloride melting at 172° C. (dec.).

*Anal.*—Calc'd. for $C_{13}H_{20}O_3NCl$: C, 57.03; H, 7.36; N, 5.12. Found: C, 56.87; H, 7.46; N, 5.58.

I claim:

1. A compound from the group consisting of di-substituted aminoindanols having the formula

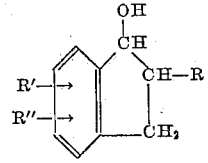

wherein R' is a methoxy radical, R'' is in a position ortho to R' and is from the group consisting of the hydroxy and methoxy radicals and R is from the group consisting of the amino, monoalkylamino, lower di-n-alkylamino and monoaralkylamino radicals, and addition salts thereof with acids.

2. 2-amino-5,6-dimethoxyindanol-1 hydrochloride.

3. 2-amino-5-methoxy-6-hydroxyindanol hydrochloride.

4. 2-benzylamino-4,5-dimethoxyindanol-1 hydrochloride.

5. 2-benzylamino-5,6-dimethoxyindanol-1 hydrochloride.

6. 2-dimethylamino-5,6-dimethoxyindanol hydrochloride.

RICHARD V. HEINZELMANN.

REFERENCES CITED

The following references are of record in the file of this patent:

UNITED STATES PATENTS

| Number | Name | Date |
| --- | --- | --- |
| 2,359,707 | Baltzly et al. | Oct. 3, 1944 |

FOREIGN PATENTS

| Number | Country | Date |
| --- | --- | --- |
| 8,957 | Great Britain | 1912 |
| 747,028 | France | June 9, 1933 |

OTHER REFERENCES

Levin et al., "J. Org. Chem.," vol. 9, p. 380–391 (1944).

Heinzelmann et al., "J. Am. Chem. Soc.," vol. 70, p. 1386–1390 (1948).